United States Patent
Wang et al.

(10) Patent No.: US 8,145,801 B2
(45) Date of Patent: Mar. 27, 2012

(54) COMPUTER, STORAGE MEDIUM AND METHOD FOR CONTROLLING OPTICAL DISK DRIVER OF THE COMPUTER

(75) Inventors: Guang-Jian Wang, Shenzhen (CN); San-Yi Shu, Shenzhen (CN); Wen-Wu Wu, Shenzhen (CN); Xiao-Mei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/875,155

(22) Filed: Sep. 3, 2010

(65) Prior Publication Data
US 2011/0247019 A1    Oct. 6, 2011

(30) Foreign Application Priority Data
Mar. 30, 2010    (CN) .......................... 2010 1 0136113

(51) Int. Cl.
*G06F 3/00* (2006.01)
(52) U.S. Cl. ............................................ 710/15; 710/16
(58) Field of Classification Search .................... 710/15, 710/16
See application file for complete search history.

(56) References Cited

U.S. PATENT DOCUMENTS
5,831,613 A * 11/1998 Johnston et al. ............... 715/771
2008/0288801 A1 * 11/2008 Takahashi ..................... 713/324
* cited by examiner

*Primary Examiner* — Chun-Kuan Lee
*Assistant Examiner* — David Martinez
(74) *Attorney, Agent, or Firm* — Altis Law Group, Inc.

(57) ABSTRACT

A method and system controls an optical disk driver (ODD) of a computer. The method detects whether an eject button connected with an I/O (input/output) chip of the computer has been pressed, and determines if an optical disk exists in the ODD when the eject button has been pressed. Additionally, the method sends a control signal to the ODD, and control the ODD to eject the optical disk when the optical disk exists in the ODD.

12 Claims, 4 Drawing Sheets

COMPUTER, STORAGE MEDIUM AND METHOD FOR CONTROLLING OPTICAL DISK DRIVER OF THE COMPUTER

BACKGROUND

1. Technical Field

Embodiments of the present disclosure relate generally to computers, and more particularly, to a computer and method for controlling an optical disk driver (ODD) of the computer, and a storage medium for storing a related program to perform the method.

2. Description of Related Art

Optical disk driver (ODD) is a very important portion of a computer. With the development of computer technology, many computers are designed smaller and smaller, such as notebooks, and netbooks. Slot-loading ODDs and ultra thin ODDs that have no mechanical eject button are widely used in the computers because the slot-loading ODDs and the ultra thin ODDs occupy less space. However, a user must use system software of the computers to eject an optical disk (OD) from the ODDs, which is very inconvenient.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
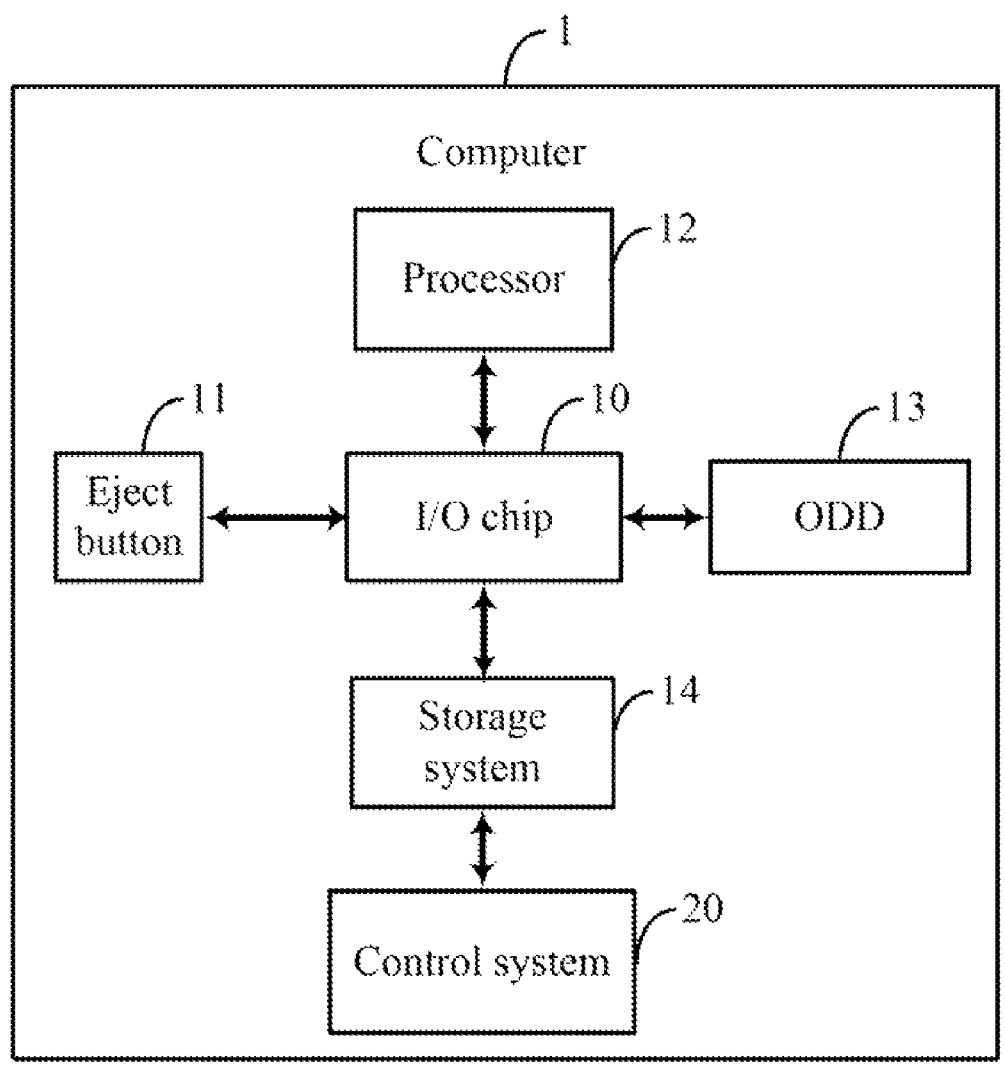
FIG. 1 is a block diagram of one embodiment of a computer.

FIG. 1 is a block diagram of one embodiment of a computer 1 having a function of controlling an ODD 13. In the embodiment, the computer 1 includes an I/O (input/output) chip 10, an eject button 11, processor 12, the ODD 13, a storage system 14, and a control system 20. The eject button 11, processor 12, ODD 13, and storage system 14 are respectively connected to the I/O chip 10. In one embodiment, the computer 1 may be a notebook, a netbook, or any other portable computing device. The I/O chip 10 may be a south bridge chip, or a super I/O chip. The ODD 13 may be a slot-loading ODD or an ultra thin ODD, which has no mechanical eject button.

Figure 2:
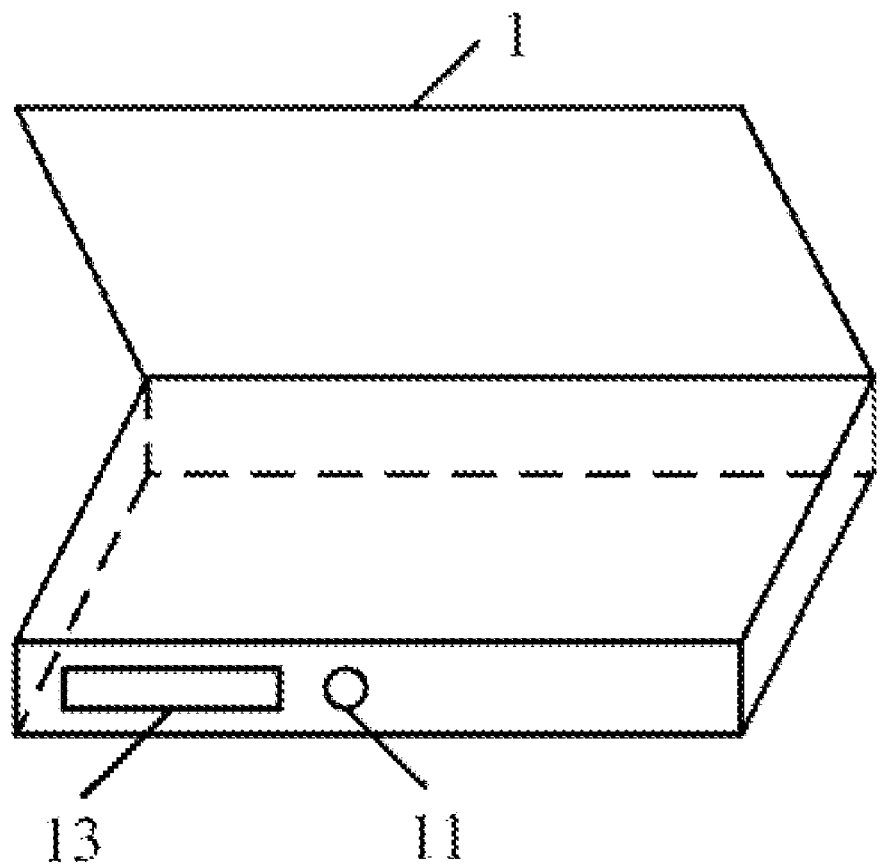
FIG. 2 is a schematic diagram illustrating an example of an optical disk driver (ODD) and an eject button incorporated in the computer of FIG. 1.

FIG. 2 is a schematic diagram illustrating an example of location of the ODD 13 and the eject button 11 incorporated in the computer 1. In one embodiment, the eject button 11 may be located adjacent to the ODD 13, and is separate from the ODD 13. It should be apparent that FIG. 1 or FIG. 2 is only one example of the computer 1 that can be included with more or fewer components than shown in other embodiments, or a different configuration of the various components.

The storage system 14 stores one or more programs, such as programs of an operating system, and other applications of the computer 1. In one embodiment, the storage system 14 may be random access memory (RAM) for temporary storage of information, and/or a read only memory (ROM) for permanent storage of information. In other embodiments, the storage system 14 may also be an external storage device, such as a hard disk, a storage card, or a data storage medium. The processor 12 executes computerized operations of the computer 1 and other applications, to provide functions of the computer 1.

Figure 3:
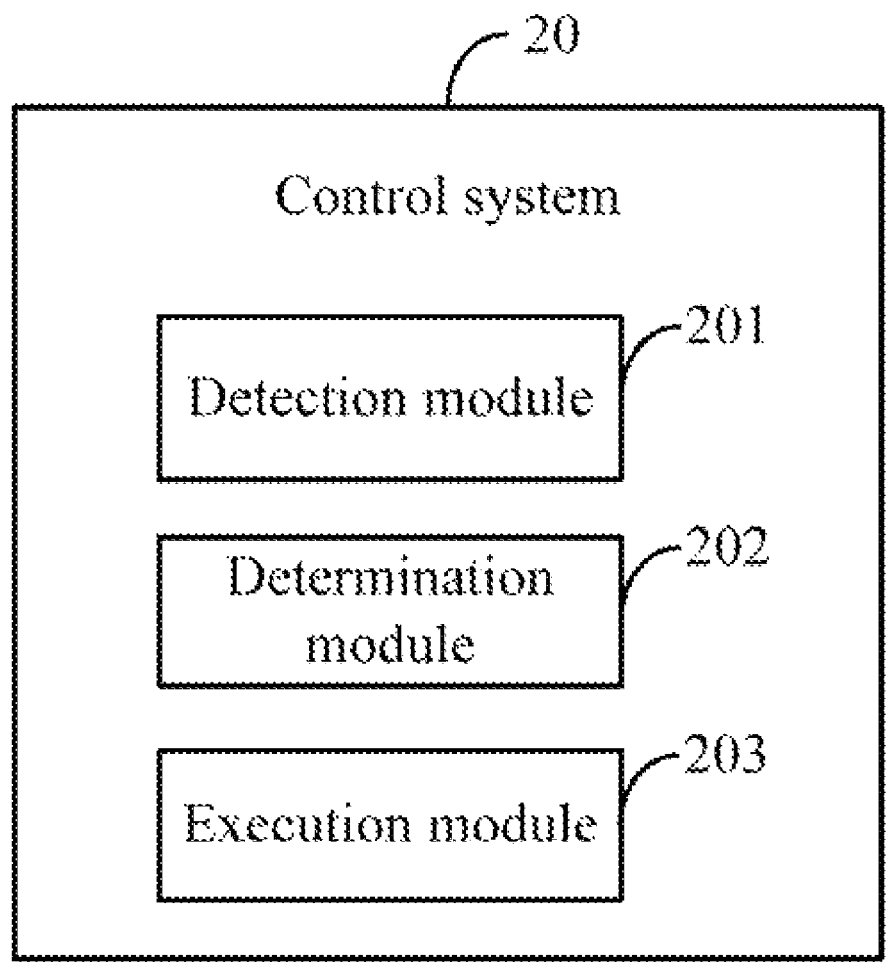
FIG. 3 is a block diagram of one embodiment of functional modules of a control system of FIG. 1.

FIG. 3 is a block diagram of one embodiment of functional modules of a control system 20 of FIG. 1. The control system 20 may include a plurality of functional modules comprising one or more computerized instructions that are stored in the storage system 14 or a computer-readable medium of the computer 1, and executed by the processor 12 to perform operations of the computer 1. In one embodiment, the control system 20 includes a detection module 201, a determination module 202, and an execution module 203. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The detection module 201 is operable to detect whether the eject button 11 has been pressed. In some embodiments, the detection module 201 detects whether the eject button 11 has been pressed using a polling method or a trigger method. The details of the polling method and the trigger method are described as follows.

The polling method means that the detection module 201 reads a driving signal from an output port of the I/O chip 10 connected with the eject button 11 in a regular interval, such as 50 milliseconds, and detects whether the eject button 11 has been pressed according to the driving signal. The driving signal may be a high level signal denoted by a digital number "1", or a low level signal denoted by a digital number "0". In the embodiment, if the driving signal is a high level signal, the detection module 201 determines that the eject button 11 has been pressed. Otherwise, if the driving signal is the low level signal, the detection module 201 determines that the eject button 11 has not been pressed.

The trigger method means that the detection module 201 is triggered to read an interrupt signal when the I/O chip 10 generates the interrupt signal. Thereupon, the detection module 201 can determine whether the eject button 11 has been pressed by detecting whether the interrupt signal is enabled from the eject button 11. In the embodiment, if the interrupt signal is enabled from the eject button 11, the detection module 201 determines that the eject button 11 has been pressed. Otherwise, if the interrupt signal is not enabled from the eject button 11, the detection module 201 determines that the eject button 11 has not been pressed.

The determination module 202 determines if an optical disk (OD) exists in the ODD 13 when the eject button 11 has been pressed. In one embodiment, the determination module 202 sends a command to the ODD 13 to read data from a control register of the ODD 13, and determines if an OD exists in the ODD 13 according to the read data. For example, if the read data is "00A1", the determination module 202 determines that there is an OD in the ODD 13. If the read data is "00A0", the determination module 202 determines that there is no OD in the ODD 13. In one embodiment, the command that is send to the ODD 13 may be an AT Attachment Packet Interface (ATAPI) command.

The execution module 203 sends a control signal to the ODD 13 when the OD exists in the ODD 13, and controls the ODD 13 to eject the OD according to the control signal. In one embodiment, the control signal may be a digital signal denoted by a digital number "1".

Figure 4:
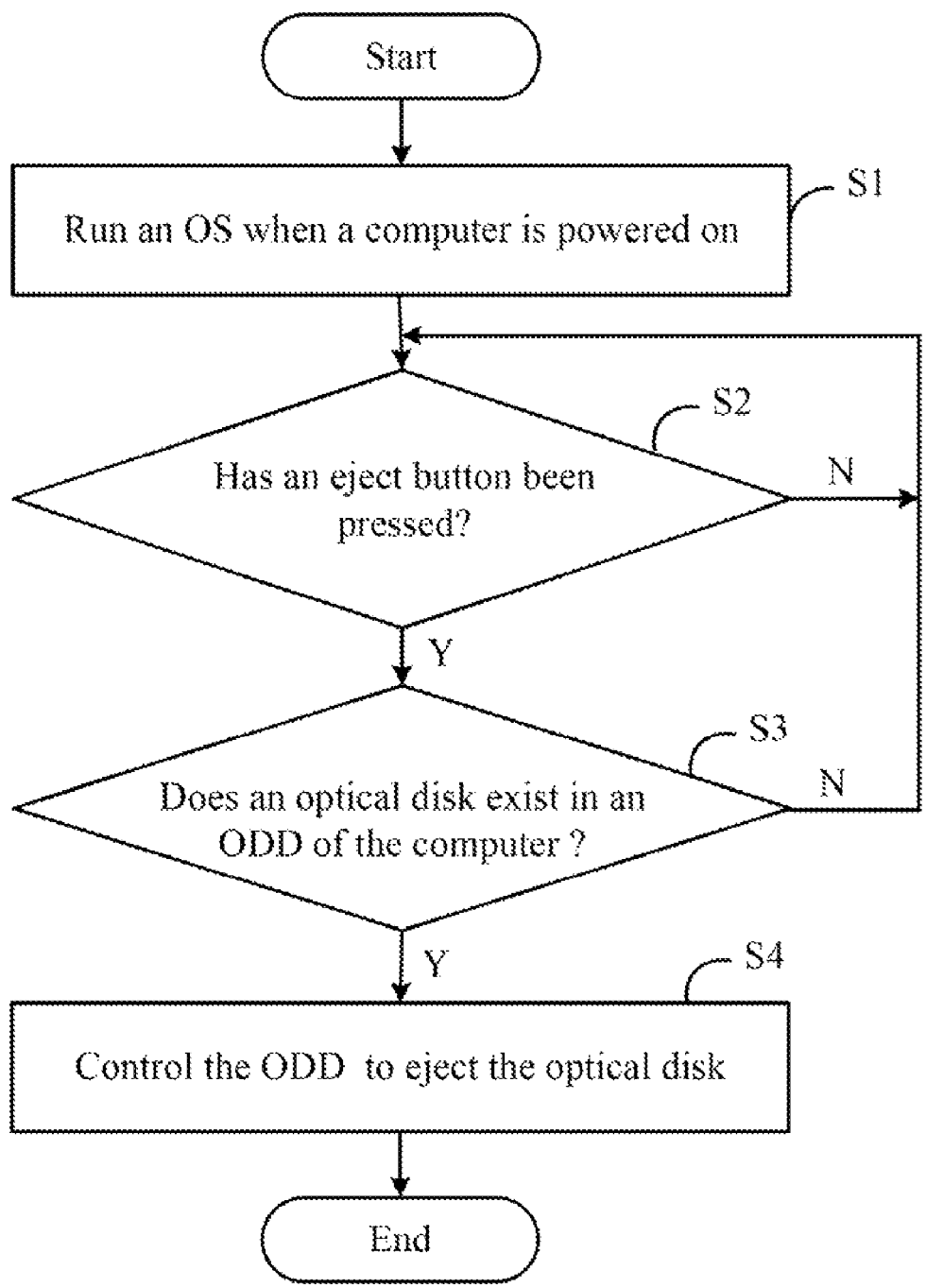
FIG. 4 is a flowchart of one embodiment of a method for controlling the optical disk driver of FIG. 1.

FIG. 4 is a flowchart of one embodiment of a method for controlling the ODD 13 of FIG. 1. The method can control the computer 1 to eject an OD from the ODD 13 using the eject button 11 connected with the I/O chip 10 of the computer 1. Depending on the embodiment, additional blocks may be added, others removed, and the ordering of the blocks, may be changed.

In block S1, the computer 1 runs an operating system (e.g., WINDOWS OS) when the computer 1 is powered on.

In block S2, the detection module 201 detects whether the eject button 11 has been pressed. If the eject button 11 has been pressed, block S3 is implemented, otherwise, if the eject button 11 has not been pressed, block S2 is repeated. In one embodiment, the detection module 201 detects whether the eject button 11 has been pressed by using a polling method and a trigger method as described above.

In block S3, the determination module 202 determines if an OD exists in the ODD 13 when the eject button 11 has been pressed. If the OD exists in the ODD 13, block S4 is implemented, otherwise, if no OD exists in the ODD 13, block S2 is repeated. In one embodiment, the determination module 202 determines if there is an OD in the ODD 13 according to data read from a control register of the ODD 13. For example, if the read data is "00A1", the determination module 202 determines that there is an OD in the ODD 13. If the read data is "00A0", the determination module 202 determines that there is no OD in the ODD 13.

In block S4, the execution module 203 sends a control signal to the ODD 13, and controls the ODD 13 to eject the OD according to the control signal. As mentioned above, the control signal may be a digital signal denoted by a digital number "1".

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computer comprising:
    an I/O (input/output) chip;
    an eject button connected with the I/O chip;
    an optical disk driver (ODD); and
    a control system stored in a storage system and being executable by at least one processor of the computer, the control system comprising:
    a detection module operable to read a driving signal from an output port of the I/O chip connected with the eject button and detect whether the eject button has been pressed according to the driving signal, or read an interrupt signal from the I/O chip when the I/O chip generates the interrupt signal and detect whether the eject button has been pressed according to the interrupt signal;
    a determination module operable to determine if an optical disk exists in the ODD when the eject button has been pressed; and
    an execution module operable to send a control signal to the ODD upon the condition that the optical disk exists in the ODD, and control the ODD to eject the optical disk according to the control signal.

2. The computer according to claim 1, wherein the determination module is further operable to send a command to the ODD to read data from a control register of the ODD, and determine if the optical disk exists in the ODD according to the data read from the control register.

3. The computer according to claim 2, wherein the command is an AT Attachment Packet Interface command.

4. The computer according to claim 1, wherein the ODD is a slot-loading ODD or an ultra thin ODD.

5. A method for controlling an optical disk driver (ODD) of a computer, the method comprising:
    detecting whether an eject button has been pressed, the eject button being connected with an I/O (input/output) chip of the computer, wherein the detecting step comprises: reading a driving signal from an output port of the I/O chip connected with the eject button and determining whether the eject button has been pressed according to the driving signal, or reading an interrupt signal from the I/O chip when the I/O chip generates the interrupt signal and determining whether the eject button has been pressed according to the interrupt signal;
    determining if an optical disk exists in the ODD when the eject button has been pressed; and
    sending a control signal to the ODD upon the condition that the optical disk exists in the ODD; and
    controlling the ODD to eject the optical disk according to the control signal.

6. The method according to claim 5, wherein the determining step comprises:
    sending a command to the ODD to read data from a control register of the ODD; and
    determining if the optical disk exists in the ODD according to the data read from the control register.

7. The method according to claim 6, wherein the command is an AT Attachment Packet Interface command.

8. The method according to claim 6, wherein the ODD is a slot-loading ODD or an ultra thin ODD.

9. A storage medium storing a set of instructions, the set of instructions capable of being executed by a processor of a computer to perform a method for controlling an optical disk driver (ODD) of the computer, the method comprising:
    detecting whether an eject button has been pressed, the eject button being connected with an I/O (input/output) chip of the computer, wherein the detecting step comprises: reading a driving signal from an output port of the I/O chip connected with the eject button and determining whether the eject button has been pressed according to the driving signal, or reading an interrupt signal from the I/O chip when the I/O chip generates the interrupt signal and determining whether the eject button has been pressed according to the interrupt signal;
    determining if an optical disk exists in the ODD when the eject button has been pressed; and
    sending a control signal to the ODD upon the condition that the optical disk exists in the ODD; and
    controlling the ODD to eject the optical disk according to the control signal.

10. The storage medium as claimed in claim 9, wherein the determining step comprises:
    sending a command to the ODD to read data from a control register of the ODD; and
    determining if the optical disk exists in the ODD according to the data read from the control register.

11. The storage medium as claimed in claim 10, wherein the command is an AT Attachment Packet Interface command.

12. The storage medium as claimed in claim 9, wherein the ODD is a slot-loading ODD or an ultra thin ODD.

* * * * *